United States Patent
Troyansky et al.

(10) Patent No.: US 7,260,215 B2
(45) Date of Patent: Aug. 21, 2007

(54) METHOD FOR ENCRYPTION IN AN UN-TRUSTED ENVIRONMENT

(75) Inventors: Lidror Troyansky, Ramat Gan (IL); Ofir Carny, Kochav Yair (IL)

(73) Assignee: PortAuthority Technologies Inc., Palo Alto, CA (US)

( * ) Notice: Subject to any disclaimer, the term of this patent is extended or adjusted under 35 U.S.C. 154(b) by 826 days.

(21) Appl. No.: 10/233,408

(22) Filed: Sep. 4, 2002

(65) Prior Publication Data

US 2003/0056118 A1 Mar. 20, 2003

Related U.S. Application Data (60) Provisional application No. 60/316,231, filed on Sep. 4, 2001.

(51) Int. Cl.
*H04K 1/00* (2006.01)
*H04L 9/00* (2006.01)
*H04L 9/32* (2006.01)
*G06F 7/04* (2006.01)
*G06F 17/30* (2006.01)
*G06F 11/30* (2006.01)
*G06F 12/14* (2006.01)
*G06K 9/00* (2006.01)

(52) U.S. Cl. ............... 380/28; 726/2; 726/3; 726/4; 726/5; 726/6; 726/7; 726/27; 726/28; 713/168; 713/169; 713/170; 713/171; 713/189; 713/190; 713/191; 713/192; 380/44; 380/45; 380/46; 380/47

(58) Field of Classification Search ........ 713/189–194; 380/277–286, 44–47, 28–30
See application file for complete search history.

(56) References Cited

U.S. PATENT DOCUMENTS

| | | | |
|---|---|---|---|
| 6,272,221 B1* | 8/2001 | Tsunoo | 380/28 |
| 2002/0031218 A1* | 3/2002 | Lin | 380/28 |
| 2002/0078346 A1* | 6/2002 | Sandhu et al. | 713/156 |
| 2003/0039357 A1* | 2/2003 | Alten | 380/46 |

* cited by examiner

*Primary Examiner*—Ayaz Sheikh
*Assistant Examiner*—Longbit Chai (57) ABSTRACT

A method and apparatus for secure distribution of information over a network, comprising: encrypting payload information using a first encryption key in a first data processor; sending the payload information encrypted using the first encryption key to a second data processor; encrypting the payload information encrypted using the first encryption key using a second encryption key in the second data processor; and sending the payload information encrypted using the first encryption key and the second encryption key to a third data processor, and generating a decryption key based on the first encryption key and on the second encryption key, such that the decryption key is operable to compute the payload information by decrypting the payload information encrypted using the first encryption key and the second encryption key.

18 Claims, 5 Drawing Sheets

METHOD FOR ENCRYPTION IN AN UN-TRUSTED ENVIRONMENT

RELATIONSHIP TO EXISTING APPLICATIONS

The present application claims priority from U.S. Provisional patent application No. 60/316,231, filed Sep. 4, 2001, the contents of which are hereby incorporated by reference.

FIELD OF THE INVENTION

The present invention relates generally to the field of digital copyright protection and digital content encryption. More specifically, the present invention deals with encryption of digital content in an un-trusted environment

BACKGROUND OF THE INVENTION

Illegal copying, dissemination and distribution of digital content is prevalent in recent years, especially using the Internet. This illegal copying and distribution is an infringement of copyright protection laws and cause financial damages to the rightful owners of the content. It is therefore of great interest to find methods that would stop or at least reduces illegal copying and/or distribution of digital content without offending rightful usage.

Methods for usage rights enforcement of digital media, digital rights management (DRM) and content protection are known. One of the most powerful building blocks in this respect is content encryption, where each of the copies of a given content is encrypted with a unique key and the keys are securely sent to the rightful user. Using these methods, digital rights management can be achieved utilizing proper key management.

In many cases, the content is liable to be stored (before it is distributed to the final user (e.g., in a proxy server, streaming server or a content distribution network). Such servers or networks may not posses an adequate level of security and therefore may not be trusted. In such cases, the content should not reside unencrypted while stored in these servers. If one is going to use key management for digital rights management, then it is required to send a content that is encrypted with one key, $K_s$, $\{E_{Ks}(P)\}$, to multiple users, $U_1, \ldots U_N$, such that each user may posses a special key, $K_1, \ldots K_N$. Using current methods, one should either first decrypt the content using the key $K_s$ and then re-encrypt the content using one of the keys $K_1, \ldots K_N$, $\{C_i = E_{Ki}(D_{Ks}(P))\}$ or else encrypt the encrypted content, $E_{Ks}(P)$, with the key $K_i$ and send the doubly-encrypted content, $\{C_{is} = E_{Ki}(E_{Ks}(P))\}$, together with the two keys, $K_s$ and $K_i$, to the final user. The first methods render the content un-encrypted before it is re-encrypted, while the second method supplies the final user the key $K_s$, which the user can thereafter send back to the storage server. Furthermore, both methods require an additional stage of encryption, which requires costly computational resources.

There is thus a recognized need for, and it would be highly advantageous to have, a method and system that allows encryption in an untrusted environment, which overcomes the drawbacks of current methods as described above.

SUMMARY OF THE INVENTION

According to a preferred embodiment there is provided a method for efficient on-line, real-time personalized encryption of digital content (e.g., video, audio, e-book, executable code, data, information etc.) that overcomes the drawbacks of methods based on re-encryption. The method comprises firstly encrypting plaintext with a first key, $K_1$: $C_1 = E_{k1}(P)$, and then encrypting the cipher text with another key, $K_2$: $C_2 = E_{k2}(C_1) = E_{k2}(E_{k1}(P))$, in a manner that is equivalent to a single encryption with a single key, $K_3$: $C_2 = E_{k2}(E_{k1}(P)) = E_{k3}(P)$. The encrypted message $C_2$ can thereafter be decrypted using a single key, $K_3$, $P = D_{k3}(C_2)$.

The method can easily be extended to M stages, $$C_M = E_{kM}(E_{k(M-1)}(\ldots (E_{k1}(P)) \ldots )).$$

In one embodiment of the present invention, the encryption method obtains its strength from the hardness of a well-known algorithmic problem, namely the problem of graph isomorphism with partial knowledge. Using this scheme, the encryption is based on first creating a matrix with binary entries, which may correspond to a connectivity matrix of a graph, and then permuting the indexes of the matrix.

In another embodiment of the present invention, the resulting matrix can serve as a "pad", with which the plaintext is xored to form the cipher text.

According to a first aspect of the present invention there is provided a method for secure distribution of information over a network, comprising:

encrypting payload information using a first encryption key in a first data processor;

sending the payload information encrypted using the first encryption key to a second data processor;

encrypting the payload information encrypted using the first encryption key using a second encryption key in the second data processor; and sending the payload information encrypted using the first encryption key and the second encryption key to a third data processor, the first and the second keys being selected such that it is possible to generate therefrom a decryption key having the following properties:

a) The decryption key is usable to obtain the payload information from the information encrypted using the first and the second encryption keys, and b) The decryption key is unusable to retrieve either of the first or the second encryption keys, the decryption key being for sending for decryption at the third data processor.

In another embodiment of the present invention the method comprising generating the decryption key, for obtaining the payload information at the third processing device.

In another embodiment of the present invention further comprising generation of secret information and the payload information is generated from the secret information.

In another embodiment of the present invention, the payload information is generated from the secret information using encryption.

In another embodiment of the present invention, the payload information is generated from the secret information using a cryptographic encoding method, the cryptographic encoding method is operable to create two significantly different outputs when presented with two similar inputs.

In another embodiment of the present invention, the payload information is a key used for encoding the secret information.

In another embodiment of the present invention, the encryption comprises:

encoding the payload information into an array having indices; and performing a permutation on at least one of the indices of the array and the encryption keys comprise information about the permutation of the indices.

In another embodiment of the present invention, the encoding comprises at least one of the following:
encryption;
signing;
padding; and
error correction code.

In another embodiment of the present invention, the array is one of the following:
a two dimensional matrix;
a multi dimensional array of more than two dimensions; and
a multi dimensional array where each dimension is of size two.

In another embodiment of the present invention, the array is one of the following:
a binary array;
a hexadecimal array;
a block array;
a sparse array;
an octal array; and
a decimal array.

In another embodiment of the present invention, the permutation performed on the indices is symmetric on at least two dimensions.

In another embodiment of the present invention, the secret information comprises at least one of the following:
software;
binary software data;
software source code;
video;
audio;
document;
text; and
multimedia.

In another embodiment of the present invention, the method further comprise at least one additional step of:
encrypting the encrypted payload information with an additional encryption key; and
sending the encrypted payload information encrypted with the additional encryption key to an additional data processor.

In another embodiment of the present invention comprising generating a decryption key based on the first encryption key and on the second encryption key, and on the additional encryption keys, the decryption key is operable to compute the payload information by decrypting the payload information encrypted with the additional encryption keys.

According to a second aspect of the present invention there is provided a method for encryption of payload information, executed using at least one data processor, the method comprising:
encoding the payload information into an array; and
performing a permutation on at least one of the indices of the array, the permutation being performed using at least one encryption key comprising information about the permutation of the indices.

In another embodiment of the present invention, the encoding comprises at least one of the following:
encryption;
signing;
padding; and
error correction encoding.

In another embodiment of the present invention, the array is one of the following:
a two dimensional matrix;
a multi dimensional array of more than two dimensions; and
a multi dimensional array where each dimension is of size two.

In another embodiment of the present invention, the array is one of the following:
a binary array;
a hexadecimal array;
a block array;
a sparse array;
an octal array; and
a decimal array.

In another embodiment of the present invention, the permutation performed on the indices is symmetric on at least two dimensions.

In another embodiment of the present invention further comprising generating a decryption key for restoring the payload information from the permutation.

In another embodiment of the present invention, the encoding is performed at a first network location, the permutation is performed at a second network location, and the decryption key is sent to a third network location.

In another embodiment of the present invention, the permutation is selected such as to require a unique decryption key for each payload.

In another embodiment of the present invention, the encoding comprises a stage of pre-encoding data manipulation to produce a randomized plaintext.

According to a third aspect of the present invention there is provided apparatus for secure distribution of information over a network, comprising:
a first key generator for generating a first encryption key for first encryption of the information and sending the first encryption key to a first network location for first encryption of the information,
a second key generator for generating a second encryption key and sending the second encryption key to a second network location for second encryption of the first encryption; and
a decryption key generator, associated with the first and second key generators for using the first encryption key and the second encryption key for generating a decryption key for sending to a third network location, the decryption key being for restoring the information from the second encryption.

In another embodiment of the present invention, the apparatus further comprises a perturber for perturbing the information prior to the first encryption.

The present embodiments successfully address the shortcomings of the presently known configurations by providing a method and system for encryption in an untrusted environment.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF PREFERRED EMBODIMENTS

The present invention is a method and system for on-line, real-time personalized encryption of digital content (e.g., video, audio, e-book, executable code, data, information etc.). The invention may be used as part of an on-line, real-time content distribution system, e.g. a video or audio on demand system operating over the Internet or some other network.

Figure 1:
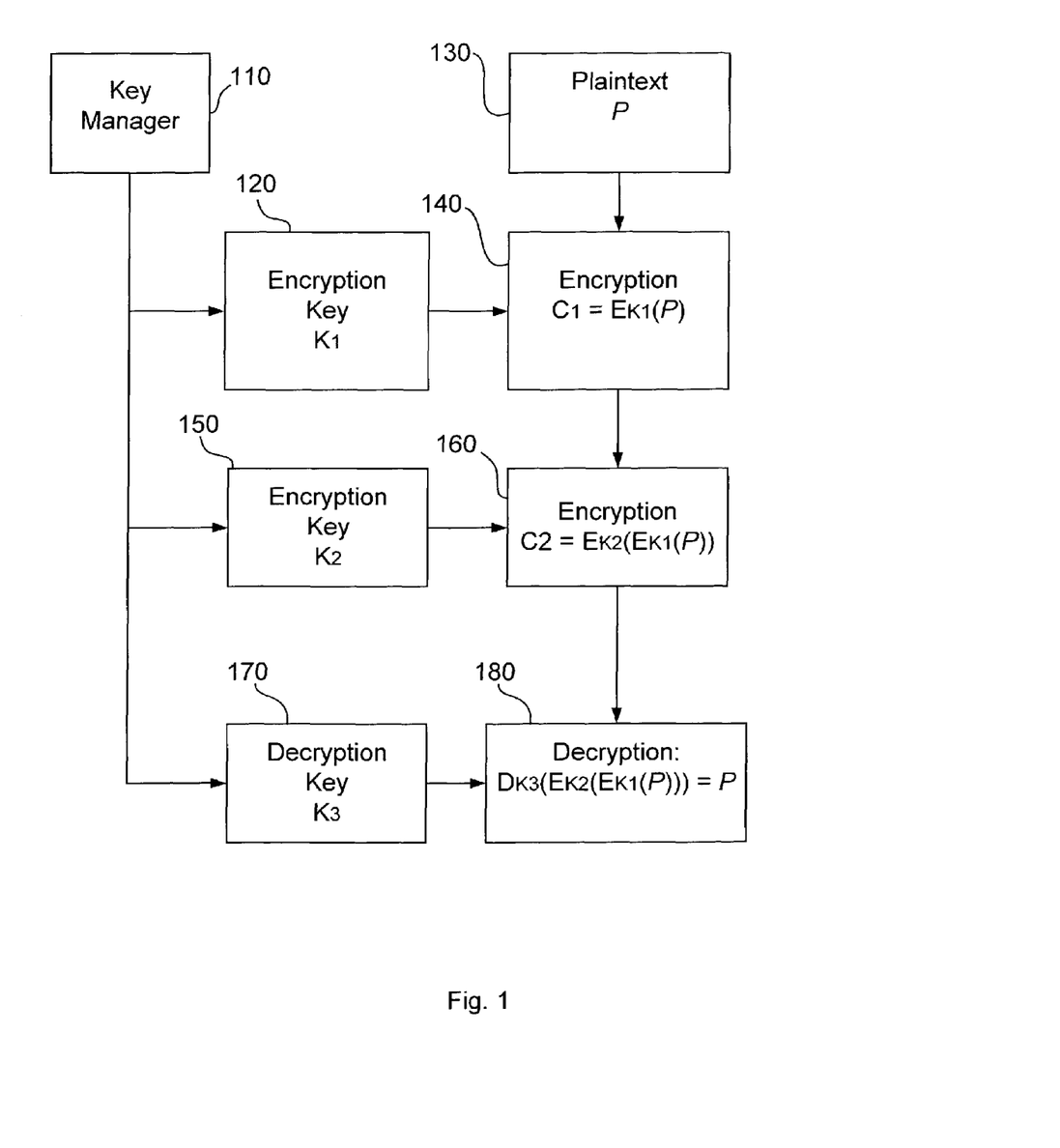
FIG. 1 is a block diagram showing the sequence steps for three-party encryption, constructed and operative in accordance with a preferred embodiment of the present invention.

Note that in this context, the word "message" means data to be transferred (which could be the aforementioned digital content). Reference is firstly made to FIG. 1, which is a simplified block diagram of the process of encapsulated encryption, in accordance with a preferred embodiment of the present encryption-related invention: a key manager 110 sends an encryption key $K_1$ 120, which is used in order to encrypt the plaintext P 130 and to produce the ciphertext 140: $C_1=E_{k1}(P)$, where $E_{ki}(X)$ denote the operation of the encryption of X with the key $K_i$. The ciphertext $C_1$ is thereafter further encrypted, using another key, $K_2$, 150, that is sent by the key manager 110 in order to produce the ciphertext $C_2=E_{K2}(E_{K1}(P))$. The encryption scheme is made such that there exists a single key, $K_3$, such that $C_2=E_{K2}(E_{K1}(P))=E_{K3}(P)$. Furthermore, the key $K_3$ can easily be derived from $K_1$ and $K_2$. The key manager 110 produces $K_3$ 170 and sends it to the decryptor 180. The decryptor perform:

$D_{K3}(C_2)=D_{K3}(E_{K2}(E_{K1}(P)))=P$, (where $D_{Ki}(X)$ denotes the operation of the decryption of X with the key Ki), and thereby reproduces the original plaintext P.

Figure 2:
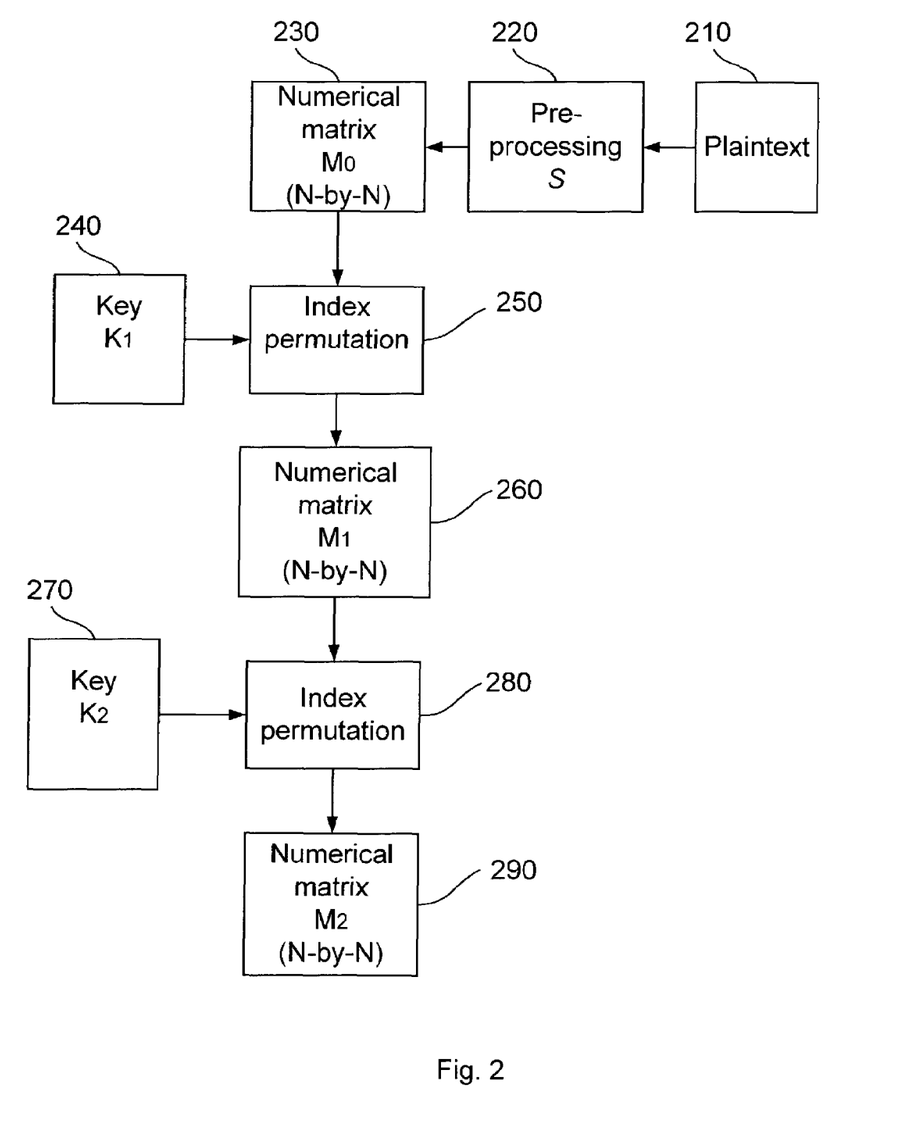
FIG. 2 is a block diagram of a method for multi-party (group) encryption, using permutations of matrix indices, constructed and operative in accordance with a preferred embodiment of the present invention.

Reference is now made to FIG. 2, which is a simplified diagram of an encryption method, constructed and operative according to a preferred embodiment of the present invention. The plaintext P 210 undergoes a pre-processing stage 220, in which it is transformed into a series of numerical values S (e.g., utilizing the ASCII or Unicode representation of the text) and elongated to a length of $N^2$ for some value of N, by padding a random set of numerical values. The pre-processed plaintext is thereafter embedded in an N-by-N matrix, $M_0$ 230. The embedding process can be performed, (e.g., by embedding the m-th element in the encoded cleartext in the ij element of the matrix. $M_0$, where i=(m−1) (mod N)+1 and j=((m−1) div N)+1) Encoding is performed by permutations of the matrix indices. The key $K_1$ 240 is a description of a permutation of the matrix indices. (Note that in order to describe an arbitrary permutation of the numbers from 1 to N, one needs $O(N \cdot \log_2 N)$ bits, where the matrix size is $N^2$). After the index permutation 250, one obtains another matrix, $M_1$ 260, in which the entry $M_{1(ij)}$ is equal to the entry $M_{0(mn)}$, providing that the permutation induced by the key $K_1$, $\Pi_{K1}$, satisfies $\Pi_{K1}(m)=i$ and $\Pi_{K1}(n)=j$, (where $\Pi_{Kx}$ is the permutation described by the key $K_x$) After performing this transformation, the message is encrypted. If the same permutation is used for the rows and the columns, then even in cases where one has access both to the plaintext and the encoded message ("known plaintext attack"), the problem of determining the key is still equivalent to the problem of finding an isomorphism between two directed graphs, a problem whose complexity is believed to be super-polynomial. A stronger scheme is obtained if two different permutations are used for the indices of the rows and the indices of the columns. In this case the complexity of decryption is believed to be, in general, exponential.

Figure 3:
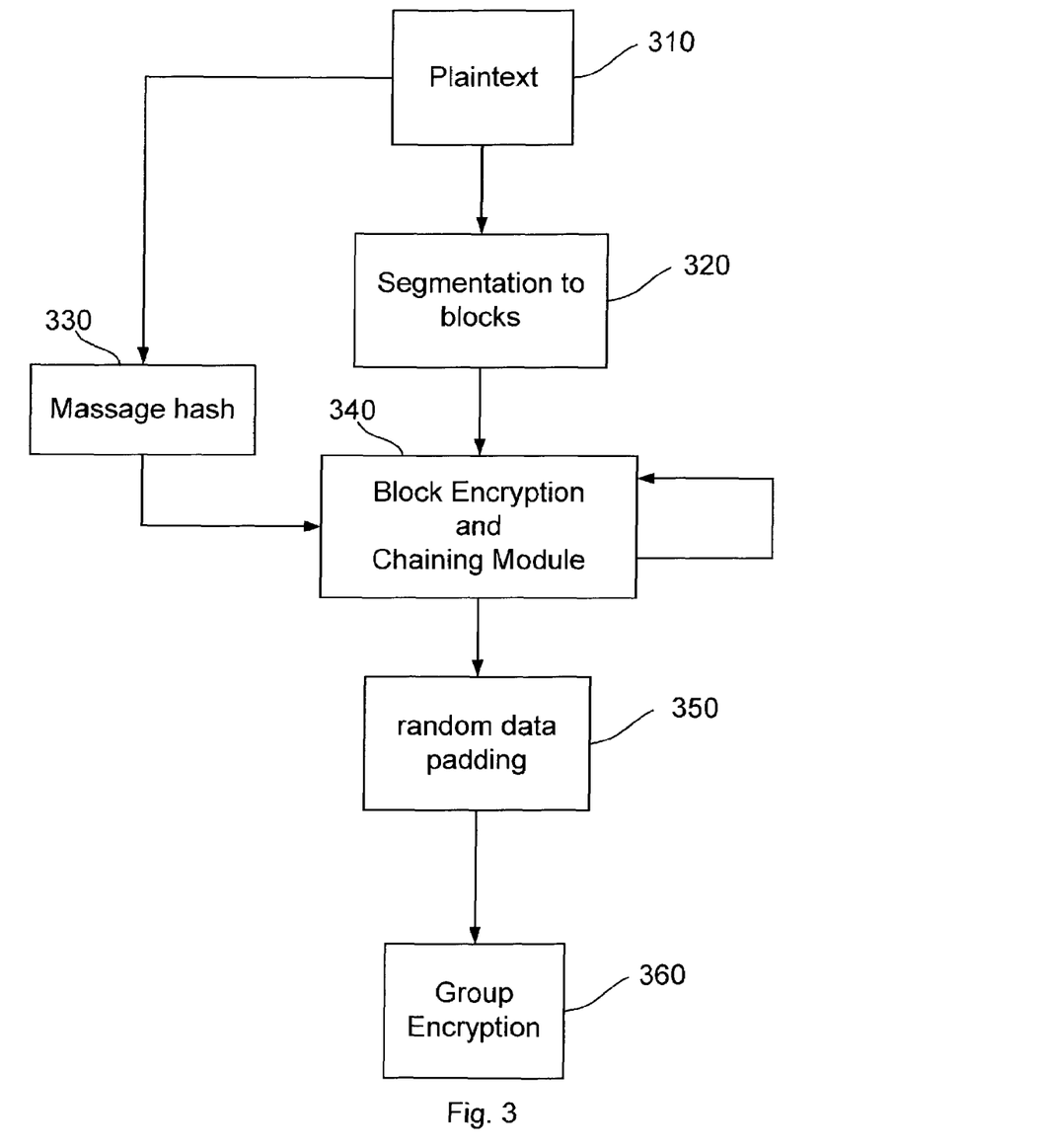
FIG. 3 is a simplified block-diagram of a preferred pre-processing stage, operative in accordance with a preferred embodiment of the present invention.

An obvious drawback of the proposed scheme is its sensitivity to differential attacks: if one can change a limited number of bits in the original message and then encode the message using the scheme described above, then one can obtain information regarding the indices of the changed bits. This problem can be solved in two ways: the first is to restrict the usage of the method to a "one-time-pad"—i.e., never encrypt two different messages with the same key. The other method is to use a pre-processing scheme that prevents the forming of two different messages with only a small number of different bits. A preferred embodiment of such preprocessing is illustrated in FIG. 3: the plaintext message 310 is segmented into blocks 320, and a cryptographic hash of message 330 is calculated. The cryptographic hash of the message 330, such as MD5, is thereafter used as an initialization vector to a block encryption and chaining module 340. This module can use one of the well-known block-cipher encryption methods, such as block chaining (BC), together with a basic block cipher such as DES, in order to encrypt the message. (The details of the encryption, together with the block-code key can be in the public domain, since the strength of the encryption does not rely upon this stage.) The encrypted message may then be padded with random data 350 (in order to make the size of the message equal to the size of the matrix) or with non-random data or any combination thereof (e.g. padded with actual content length and then a variable length CRC checksum) and is then served as an input to the group-cipher module 360. The preprocessing effectively prevents an attacker from producing a message that differs from the original message in a small number of bits, since any change in the input to BC encryption completely changes the ciphertext, (starting from the location of the change), and any change to the original message completely changes its hash, which serves as an initiation vector to the BC.

In another embodiment of the present invention, the message is embedded in a multidimensional array, N1-by-N2-by-N3, . . . -by-Nm, and the indices in each of the dimensions undergone a different permutation. In this case, the number of bits that are needed in order to encode the key is:

$$O\left(\sum_{i=1}^{m} N_i \log(N_i)\right),$$

where the message size is:

$$\prod_{i=1}^{m} N_i.$$

The ratio between the message size and the key size therefore becomes larger if more dimensions are used.

In another embodiment of the present invention the elements of the array are non-binary. In this case each element of the multi-dimensional array can be encoded using a group of n>1 bits.

In another embodiment of the present invention, the permutations that are used for encryption are not drawn from a uniform distribution, in order to allow for shorter key size.

In another embodiment of the present invention, the set of permutations that is used for encryption is restricted, in order to allow for a shorter key-size.

Encoding a permutation requires encoding an array of indices, this naively means encoding $$\sum_{i=1}^{N} \lceil \log(N) \rceil = N \lceil \log(N) \rceil \text{ bits}$$

(encoding each index require$\lceil \log(N) \rceil$ bits). But after encoding i indices, it is only required to encode numbers in the range [1,N−i] so there is a need only for $$\sum_{i=1}^{N} \lceil \log(N-i) \rceil \text{ bits}$$

for each of the different dimensions. Compression may reduce the number of bits further to the theoretical limit derived from encoding (N−1)! possible permutations, i.e.

$$\sum_{i=1}^{N} \log(N-i).$$

Figure 4:
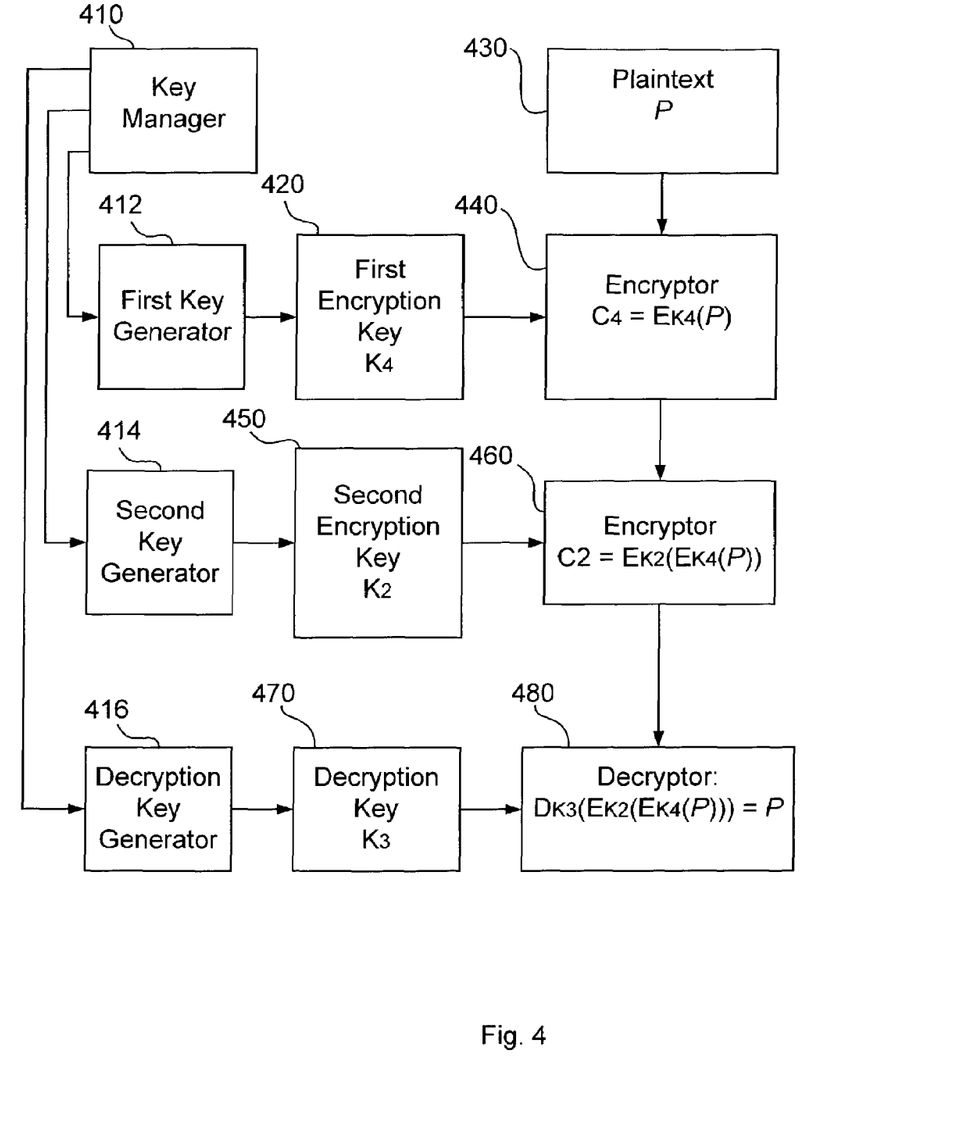
FIG. 4 is a simplified block diagram showing an apparatus for multi-point encryption, constructed and operative according to a preferred embodiment of the present invention.
Figure 5:
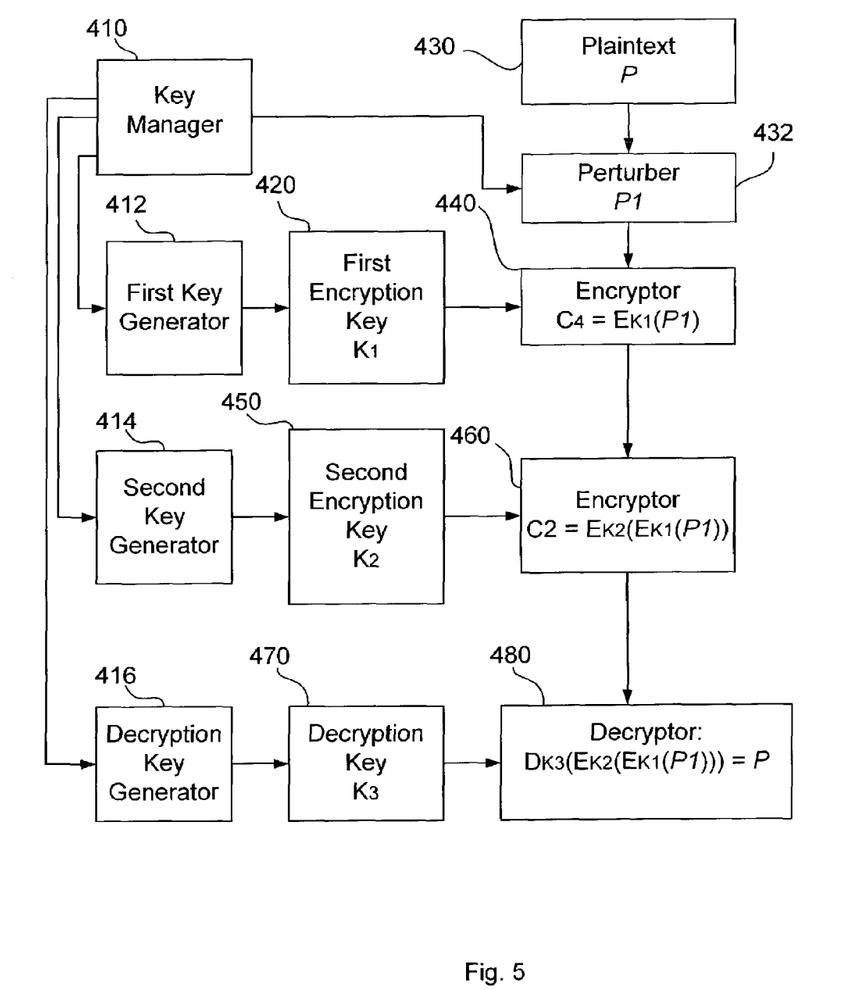
FIG. 5 is a simplified block diagram showing an apparatus for multi-point encryption substantially similar to the one illustrates in FIG. 4, which also contain a data perturber.

Turning now to FIG. 4, there is illustrated an apparatus for multi-point encryption, constructed and operative according to a preferred embodiment of the present invention. A key manager 410 instructs a first key generator 412 to generate a first encryption key $K_i$ 420, which is used by the first encryptor 440 in order to encrypt the plaintext P 430 and to produce the first ciphertext: $C_1 = E_{k1}(P)$, where $E_{ki}(X)$ denotes the operation of the encryption of X with the key $K_i$. The key manager 410 also instructs the second key generator 414 to generate a second encryption key $K_2$. The first ciphertext $C_1$ is thereafter further encrypted by the second encryptor 460 using the key, $K_2$, and produces the ciphertext $C_2 = E_{K2}(E_{K1}(P))$. The encryption scheme is made such that there exists a single key, $K_3$, such that $C_2 = E_{K2}(E_{K1}(P)) = E_{K3}(P)$. Furthermore, the key $K_3$ can easily be derived from $K_1$ and $K_2$. The key manager 410, instructs the decryption key generator 412 to produce the decryption key $K_3$ 470 and send it to the decryptor 480. The decryptor performs:

$D_{K3}(C_2) = D_{K3}(E_{K2}(E_{K1}(P))) = P$, (where $D_{Ki}(X)$ denotes the operation of decryption of X with the key Ki), and thereby reproduces the original plaintext P. FIG. 5, illustrates an apparatus for multi-point encryption, substantially similar to the one illustrated in FIG. 4, but which additionally contains perturber 432, that implements a pre-processing stage similar to the one illustrated in FIG. 3. In this case the key manager 410 sends a perturbation key to the perturber 432 and sends to the decryptor 480 information for inverting the perturbation.

It is appreciated that one or more steps of any of the methods described herein may be implemented in a different order than that shown while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available as prior art to the present invention.

The invention claimed is:

1. A method for secure real-time distribution of digital media content over a network comprising:

encrypting payload digital media content using a first encryption key in a first data processor;

sending said payload digital media content encrypted using said first encryption key to a second data processor;

encrypting said payload digital media content encrypted using said first encryption key using a second encryption key in said second data processor; and sending said payload digital media content encrypted using said first encryption key and said second encryption key to a third data processor;

providing said first and said second keys to generate a decryption key having the following properties:

a) the decryption key is usable to obtain said payload digital media content from said digital media content encrypted using said first and said second encryption keys, and
  b) the decryption key is unusable to retrieve either of said first or said second encryption keys, said decryption key being for sending for decryption at said third data processor;
  wherein said payload digital media content consists of one of:
    i. video content
    ii. audio content, and
    iii. executable code
  wherein said encryption comprises: encoding said payload digital media content into an array having indices; and performing a permutation on at least one of the indices of said array and wherein said encryption keys comprise information about said permutation of said indices;
  wherein said performing a permutation on at least one of the indices comprises performing said permutation separately on each one of the dimensions of said indices.

2. The method of claim 1, comprising generating said decryption key, for obtaining said payload digital media content at said third processing device.

3. The method of claim 1, further comprising generation of secret digital media content and wherein said payload digital media content is generated from said secret digital media content.

4. The method of claim 3, wherein said payload digital media content is generated from said secret digital media content using encryption.

5. The method of claim 3, wherein said payload digital media content is generated from said secret digital media content using a cryptographic encoding method.

6. The method of claim 3, wherein said payload digital media content is a key used for encoding said secret digital media content.

7. The method of claim 3, wherein said secret digital media content comprises at least one of the following: software; binary software data; software source code; video; audio; document; text; and multimedia.

8. The method of claim 1, wherein said encoding comprises at least one of the following: encryption; signing; padding; and error correction code.

9. The method of claim 1, wherein said array is one of the following: a two dimensional matrix; a multi dimensional array of more than two dimensions; and a multi dimensional array where each dimension is of size two.

10. The method of claim 1, wherein said array is one of the following:
  a binary array; a hexadecimal array; a block array; a sparse array; an octal array; and a decimal array.

11. The method of claim 1, wherein said method further comprise at least one additional step of: encrypting said encrypted payload digital media content with an additional encryption key; and sending said encrypted payload digital media content encrypted with said additional encryption key to an additional data processor.

12. The method of claim 11, comprising generating a decryption key based on said first encryption key and on said second encryption key, and on said additional encryption keys, wherein said decryption key is operable to compute said payload digital media content by decrypting said payload digital media content encrypted with said additional encryption keys.

13. A method for encryption and distributing payload digital media content, executed using at least one data processor, the method comprising:
  encoding, at a first network location, said payload digital media content into an array;
  performing a first permutation, at said first network location, on at least one of the indices of said array, said first permutation being performed using at a first encryption key comprising information about said first permutation of said indices;
  sending said payload digital media content encrypted using said first encryption key to a second network location;
  performing a second permutation, at said second network location, on at least one of the indices of said array, said second permutation being performed using a second encryption keys comprising information about said second permutation of said indices;
  generating a decryption key for restoring said payload digital media content from said first and second permutations; and
  sending said decryption key to a third network location;
  wherein said payload digital media content consists of one of:
    i. video content
    ii. audio content, and
    iii. executable code;
  wherein said performing a permutation on at least one of the indices comprises performing said permutation separately on each one of the dimensions of said indices.

14. The method of claim 13, wherein said encoding comprises at least one of the following: encryption; signing; padding; and error correction encoding.

15. The method of claim 13, wherein said array is one of the following: a two dimensional matrix; a multi dimensional array of more than two dimensions; and a multi dimensional array where each dimension is of size two.

16. The method of claim 13, wherein said array is one of the following: a binary array; a hexadecimal array; a block array; a sparse array; an octal array; and a decimalarray.

17. The method of claim 13, wherein said permutation is selected such as to require a unique decryption key for each payload.

18. The method of claim 13, wherein said encoding comprises a stage of pre-encoding data manipulation to produce a randomized plaintext.

* * * * *